June 30, 1953 J. MAZAR 2,643,717
LATHE ATTACHMENT
Filed Sept. 30, 1946 2 Sheets-Sheet 1

Inventor
JASPER MAZAR,
Attorney

June 30, 1953 J. MAZAR 2,643,717
LATHE ATTACHMENT
Filed Sept. 30, 1946 2 Sheets-Sheet 2

Inventor
JASPER MAZAR,
Attorney

Patented June 30, 1953

2,643,717

UNITED STATES PATENT OFFICE 2,643,717

LATHE ATTACHMENT

Jasper Mazar, Binghamton, N. Y.

Application September 30, 1946, Serial No. 700,212

9 Claims. (Cl. 164—47)

This invention relates to improvements in lathe attachments, and more particularly to an improved cutting-off attachment adapted to be secured to the bed of an engine, bench, handscrew, toolroom type and like types of lathes for effecting a work cutting-off operation.

Broadly stated, the invention contemplates a novel form of low-cost lathe cutting-off attachment, of the type that can be quickly and readily attached to and removed from conventional lathes of the various makes and sizes, which is so constructed and designed that it adds greatly to the potential output thereof, while at the same time eliminating the dangers and/or laborious and time-consuming operation of cutting off the finished work piece with a hack-saw or by the use of a cross-slide type of cutting-off tool.

In its more specific aspects, the invention aims to provide a lathe cutting-off attachment which is designed to be mounted in upright position around the spindle nose and work securing collet of the lathe, thus enabling a cut-off blade carried by the frame in a normally inactive or out-of-the-way position to approach and sever the work-piece secured by and protruding from the collet very close to the latter.

A further aim of the invention is the provision of a lathe cutting-off attachment for lathes which is so mounted as to add an extra tool station in space that was formerly wasted, thus adding to the versatility of the machine and rendering it capable of handling a complicated work piece which under the current practice would require completion on another and separate machine and hence another handling of the work piece. Yet another object of the invention is the provision of a lathe cutting-off attachment which is so constructed that it is instantly ready to function on any diameter of stock within the capacity of the lathe without pre-adjustment, and in which the cut-off blade is always "on center" and thus is capable of functioning on the work piece regardless of the type or particular characteristics thereof, without any requirement for change of tool position or setting, and without disturbance of any other tool stations.

A still further object of the invention is the provision of a lathe cutting-off attachment of the type employing an economical and fool-proof cut-off blade of a type that can be used down to a fraction of its starting length, and which moreover allows side and back clearance, which latter feature is one of advantage in that the blade is prevented from "hogging in" into the work piece to be severed, and the consequent danger of blade breakage during the cutting-off operation is substantially eliminated.

Yet another object of the invention is the provision of a lathe cutting-off attachment employing a main frame which is adapted to various makes and types of lathes now on the market, with only slight changes of base and collet clearance hole dimensions being required to enable it to be fitted to a particular lathe, which is further so constructed that it can be secured to existing lathes and removed therefrom in simple assembly and disassembly operations, which is capable of simple manual operation as and when desired, and which provides for the automatic return of the cut-off blade to a retracted, out-of-the-way position following each cutting-off operation, in which it is "on center" for the next and succeeding operations.

The above and other objects and features of advantage of the invention will be apparent from the following description thereof, taken with the accompanying drawings, in which.

Figure 1:
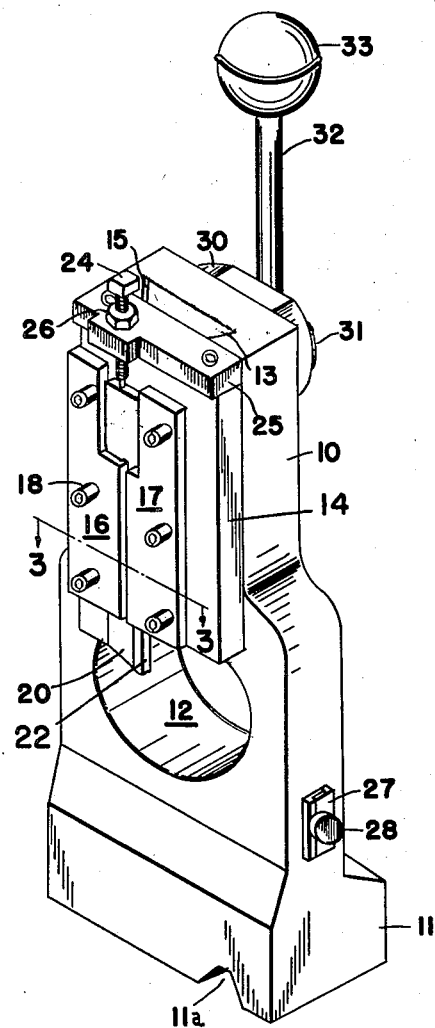
Fig. 1 is a front view in perspective of a lathe cutting-off attachment according to the invention.
Figure 2:
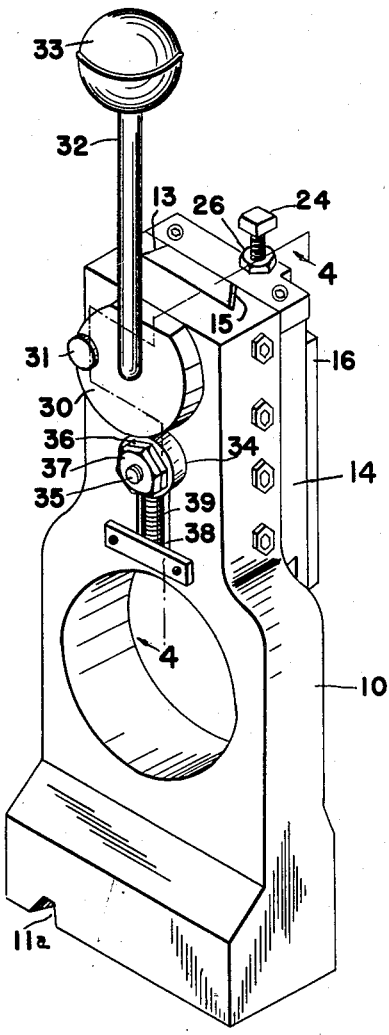
Fig. 2 is a rear view thereof.

In the drawings, wherein like reference characters designate like parts throughout the several views, reference character 10 designates the main frame of the attachment which is adapted to be secured in upright position on the bed of an existing lathe; the base 11 of the frame being machined as at 11a to satisfy the peculiarities of the bed-ways of the lathe on which the attachment is to be installed, and being moreover provided with a T-slot 11a (not shown) for the reception of a securing bolt. In its body portion the frame is provided with a tapered spindle opening 12, through which the spindle nose of the lathe can protrude with suitable clearance upon installation of the attachment, as will be described.

Figure 3:
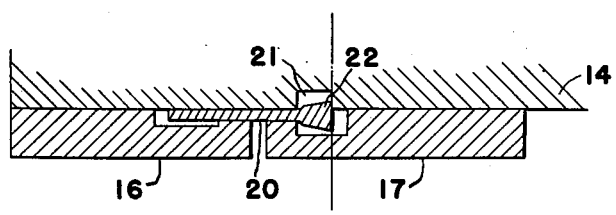
Fig. 3 is a section taken along line 3—3 of Fig. 2.

The forward face of the frame is provided with a vertical slide-way 13 in which a dovetail slide 14 is mounted for vertical travel, proper sliding clearance for the slide without slack being maintained as by a bronze gib 15. Secured in vertical position against the front face of the slide 14 by two clamping plates 16, 17 held by bolts 18 is a cut-off blade 20, which is preferably of the so-called Luers type, mounted so that its bottom edge extends well below the bottom edge of the slide. As best seen in Fig. 3, the front face of the slide is machined with a vertical groove 21 provided to receive the vertically disposed cutting edge 22 of the blade, and the inner faces of the clamping plates are also relieved as shown, thus to permit the flat side faces of the blade to be firmly secured between clamping plates and slide. According to the invention, the blade is mounted absolutely vertical, and so that the line of its cutting edge lies on a vertical center line extending through the lathe spindle axis.

As seen in Fig. 1, the cut-off blade is backed up by an adjusting screw 24 carried by a slide end-block 25, the screw being fixed in adjusted position by a lock-nut 26. The adjusting screw 24 can directly back up the blade in its various lengths or, when the screw reaches its most advance position of adjustment due to the successive re-grindings of the blade, its length may be effectively increased by an insert piece (or pieces) 27, which is interposed between the lower end of the screw and the top edge of the blade, thereby to facilitate further advance of the latter while utilizing the same adjusting screw. A supply of the inserts 27 may be maintained in storage position on the frame, as shown in Fig. 1, being removably secured thereto by a thumb screw 28.

Figure 4:
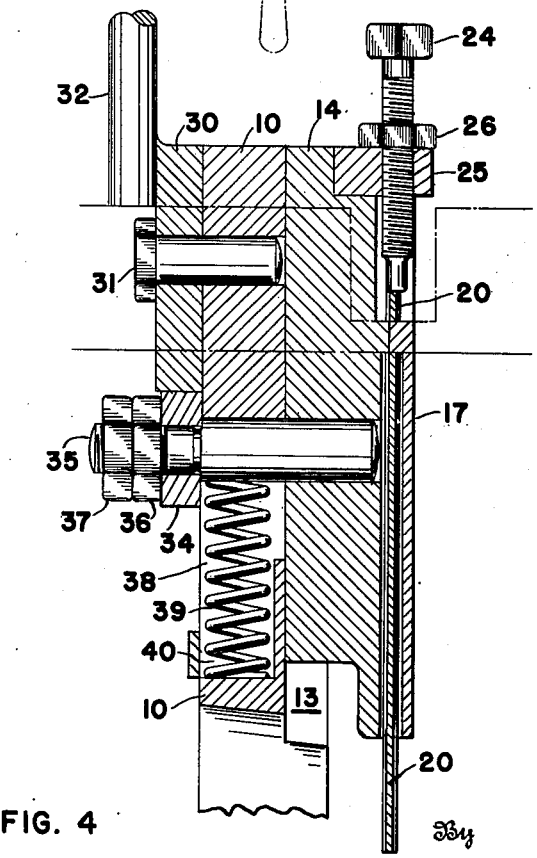
Fig. 4 is a section taken along line 4—4 of Fig. 2.

The slide and blade assembly is adapted to be positively actuated in downward direction by simple manual means which, in the illustrated construction, includes a rotary cam 30 mounted to turn on the axis of an off-center stud 31 fixedly secured to the main frame (Fig. 4). Rotary motion is imparted to the cam by an operating handle 32 which is normally vertically disposed as shown and which is fixed at one end to the cam center and is provided at its free end with an enlarged hand knob 33. The aforesaid cam bears on a cam roller 34 secured by nuts 36, 37 on a shaft 35 fixed in the slide 14. The shaft 35 operates in a vertical guide slot 38 provided in the frame and is normally maintained in an uppermost position by a compression spring 39 whose lower end seats into a frame recess 40 opening through the bottom-end wall of the guide slot, and whose upper end may bear directly against the shaft, as shown. The spring 39 is sufficiently stiff as to normally urge the shaft 35, and hence the slide and cut-off blade assembly, to a raised, out-of-the-way position with respect to the work, the operating handle 32 meantime being vertically disposed. However, simple turning movement of the handle in counter-clockwise direction (Fig. 1) results in corresponding rotation of cam 30, which thereupon exerts pressure against cam roller 34 to actuate the shaft 35, together with slide 14 and cut-off blade 20 carried thereby, in downward direction against the pressure of the spring 39. By a proper choice of the throw of the cam, a 90° rotation of the handle is ample, not only to bring the blade into engagement with the work piece but also to lower it sufficiently as to effect the desired cutting-off operation. Upon completion of said operation and release of the handle, spring 39 returns the slide and cut-off blade assembly to its initial, out-of-the-way position.

Figure 5:
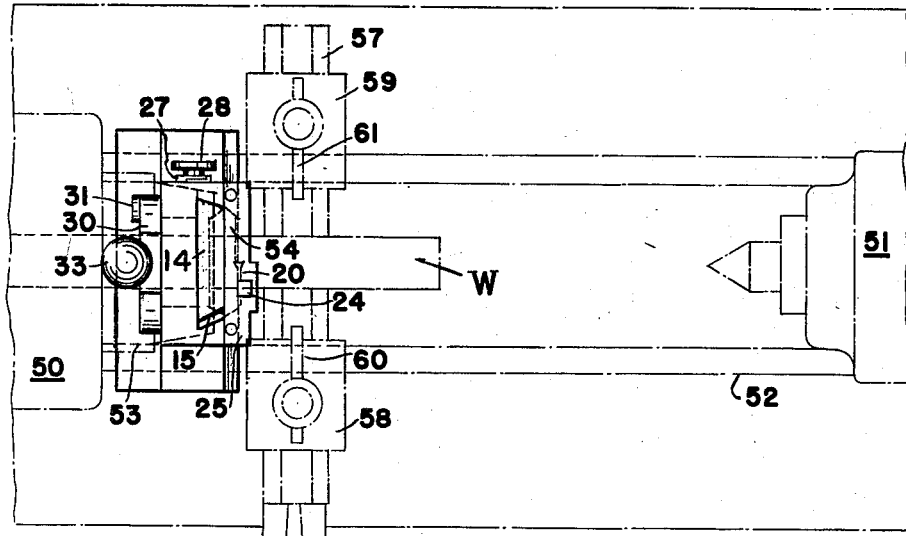
Fig. 5 is a schematic top view showing installation position of the lathe cutting-off attachment as herein contemplated on a bench lathe.

To illustrate the installation position of a lathe cutting-off attachment as described, reference is had to Fig. 5, illustrating a typical bench lathe having a head stock 50 and a tail stock 51 operating on the lathe bed-ways 52, as usual. The head stock carries a work spindle 53 terminating in a tapered nose, in which is contained a collet 54 which secures the material or work W being formed or turned, which is shown to take the form of an elongated piece of stock protruding from the collet in the direction of the tail stock 51. The lathe is provided with a cross-slide 56, 57 mounting the carriages 58, 59, respectively, the carriages in turn mounting tool posts in which the forming or turning tools 60, 61 are secured. The work piece secured by the collet is operated on by the forming tools 60, 61, in the conventional manner, it being understood that the forming tools and their mounts as shown typify the usual tool stations for effecting various turning operations on the work piece, with which the conventional bench lathe is provided.

A cutting-off attachment according to the invention is installed as by sliding the attachment frame 10 along the lathe bed-ways to a position forwardly of the head stock 50 by an amount such that the nose of spindle 53 and the collet 54 extend into and through the tapered opening 12 provided in the attachment frame. It will be understood that the base 11 of the frame is machined to fit the bed-ways of the particular lathe on which installation is being effected, and that suitable securing means (not shown) will be provided to securely mount the frame in its position aforesaid, such securing means engaging in the above referred to threaded hole provide in the frame base.

With the attachment positioned and secured as aforesaid, it will be observed that the collet extends somewhat forwardly of the front face of the attachment frame, and that the cut-off blade 20 operates in a vertical plane which clears the collet but is nevertheless close to the front face thereof. Accordingly, although the blade normally assumes an out-of-the-way position above the work W held by the collet, it is always "on center" with respect to the work, that is to say, its cutting edge is exactly vertical to the axis of the spindle nose and collet and hence to the center line of the work.

A cutting-off attachment positioned as aforesaid in nowise interferes with the operation of the forming tools 60, 61 inasmuch as the cut-off blade is normally maintained in a raised position. Hence, the forming tools may be operated as heretofore, and in manner quite independent of the cutting-off attachment. When it is desired to effect the cutting-off operation, the operator merely grasps the hand knob 33 provided on the handle 32 and swings the latter about the axis of stud 31. The slide 14 is thereby caused to move downwardly, and the cut-off blade 20 is accordingly lowered against the work piece to sever the same from the portion thereof secured by the collet 54. Due to the positioning of the attachment frame about the spindle nose and the relative position of cut-off blade to collet, the blade can operate quite close to the collet to effect a close cut-off. The aforesaid lowering and cutting-off operation of the blade is quite independent of the operation and positioning of the forming tools 60 and 61, it being noted that their position need not be changed for the cutting-off operation, except that they should be backed away from the work piece as is usual. Upon completion of the cutting-off operation, handle 32 is released whereupon spring 39 automatically returns the slide and cut-off blade assembly and its operating handle 32 to the initial out-of-theway position, permitting advance feed of the stock being worked through the collet and a succeeding turning operation thereon by the forming tools.

Without further analysis, it will be seen that a cutting-off attachment according to the invention adds an extra tool station to the lathe in a space that was formerly wasted and thus adds to its versatility, a feature of advantage on medium quantity production runs, for example. As distinguished from the so-called built-in cutting-off attachments, the lathe attachment above described requires no timing and is therefore always ready to function at a moment's notice without regard to being timed with other tool operations and without requiring the other tool stations to be disturbed in any way, which accordingly may perform their same operations as previously.

Moreover, the lathe attachment according to the invention may be quickly attached to and as quickly detached from the machine, as no permanent mounting thereof is required and hence the cost of the lathe may be kept low.

It is a further feature of the invention that the type of cut-off blade employed permits its use down to a minimum length of 1½", which is much smaller than any other cut-off blade or parting tool now in existence. The blade is further of the type which allows for side and back clearance, which prevents the blade from "hogging in" to the work piece, and hence substantially eliminates the danger of tool breakage during the cutting-off operation.

Moreover, a cutting-off attachment as described is so simple in its operation that it overcomes the tendency of the machine operator to sever the work piece by the dangerous and costly task of cutting off the same by hand with a hacksaw, rather than to disturb his forming tool settings.

As many changes could be made in carrying out the above construction without departing from the scope of the invention, it is intended that all matter contained in the above description or shown in the accompanying drawings, shall be interpreted as illustrative and not in a limiting sense.

I claim:

1. A lathe cutting-off attachment adapted to be mounted from the bed-ways of an existing lathe and to be positioned in forwardly spaced relation with respect to the head stock and about the spindle nose of the lathe comprising an upright frame having an opening for the reception of the spindle nose and work securing collet contained therein, said frame including a base having provision for adapting the frame to the lathe bedways and for securing it in position wherein the collet extends a small distance forwardly of the frame front-face, a cut-off blade carried by said frame forwardly of the front face thereof to operate in a vertical plane which clears but is close to the collet and being normally disposed above the work, means mounting said blade for vertical travel and in position such that its cutting edge is vertical to the spindle and collet axis and hence to the center line of the work, manual means operative in the space between the head stock of the lathe and said upright frame for positively actuating said blade downwardly into engagement with the work secured by said collet, and means for effecting return of said blade to its normal raised position upon release of said manual means.

2. A lathe cutting-off attachment adapted to be mounted from the bed-ways of an existing lathe and to be positioned in forwardly spaced relation with respect to the head stock and about the spindle nose of the lathe comprising an upright frame having an opening for the reception of the spindle nose and work securing collet contained therein, said frame including a base having provision for adapting the frame to the lathe bedways and for securing it in position wherein the collet extends a small distance forwardly of the frame front-face, a cut-off blade having a normal inactive position above the work and being operative in a vertical plane which clears but is close to the collet, means mounting said cut-off blade in the frame for reciprocation in a vertical plane which is forward of same plane and in position such that its cutting edge is vertical to the spindle and collet axis and hence to the center line of the work, means operative in the space between the head stock of the lathe and said upright frame for positively reciprocating said blade in downward direction against the work secured by the collet, and means operative upon release of said last means for effecting return of the blade to its normal inactive position.

3. A lathe cutting-off attachment adapted to be mounted from the bed-ways of an existing lathe and to be positioned in forwardly spaced relation with respect to the head stock and about the spindle nose of the lathe comprising an upright frame having an opening for the reception of the spindle nose and work securing collet contained therein, said frame including a base having provision for adapting the frame to the lathe bedways and for securing it in position wherein the collet extends a small distance forwardly of the frame front-face, a cut-off blade having a normal inactive position above the work and being operative in a vertical plane which clears but is close to the collet, means mounting said cut-off blade in the frame for reciprocation in a vertical plane which is forward of same frame and in position such that its cutting edge is vertical to the spindle and collet axis and hence to the center line of the work, manually operable means carried by said frame and being operative in the space between the head stock of the lathe and said frame for reciprocating said blade in downward direction and against the work secured by the collet, and spring means also carried by said frame for returning said blade to its initial inactive position.

4. A lathe cutting-off attachment adapted to be mounted from the bed-ways of an existing lathe and to be positioned in forwardly spaced relation with respect to the head stock and about the spindle nose of the lathe comprising an upright frame having an opening for the reception of the spindle nose and work securing collet contained therein, said frame including a base having provision for adapting the frame to the lathe bedways and for securing it in position wherein the collet extends a small distance forwardly of the frame front-face, a slide mounted for vertical reciprocation in said frame, a vertically arranged cut-off blade carried by said slide forwardly thereof to operate in a vertical plane which clears but is close to the collet and having its cutting edge vertical to the spindle and collet axis and hence to the center line of the work, means normally maintaining said slide and blade in a raised, out-of-the-way position with respect to the work secured by the collet, said last means being also operative to effect return of the slide and blade to raised position following downward travel thereof, and manual means including a handle pivotally mounted for swinging movement in a vertical plane disposed intermediate the head stock of the lathe and said frame for imparting vertical travel in downward direction to the slide, thereby to bring said blade into engagement with the work.

5. A lathe cutting-off attachment adapted to be mounted from the bed-ways of an existing lathe and to be positioned in forwardly spaced relation with respect to the head stock and about the spindle nose of the lathe comprising an upright frame having an opening for the reception of the spindle nose and work securing collet contained therein, said frame including a base having provision for adapting the frame to the lathe bedways and for securing it in position wherein the collet extends a small distance forwardly of the frame front-face, a slide operatively associated with the front face of said frame and being mounted for vertical reciprocation, a vertically arranged cut-off blade disposed in a plane forwardly of but close to the collet, clamping plates for securing the blade to the slide in position such that its cutting edge is vertical to the spindle and collet axis and hence to the center line of the work, manual means operative in the space between the head stock of the lathe and the frame for actuating the slide in downward direction whereby to bring the blade into engagement with work secured by the collet, and spring means carried by said frame for effecting return vertical travel of the slide and the cut-off blade.

6. A lathe cutting-off attachment as set forth in claim 5, wherein the manual means for actuating the slide in downward direction includes an eccentrically mounted cam and a handle for turning the same.

7. A lathe cutting-off attachment as set forth in claim 5, wherein the manual means for actuating the slide in downward direction includes an eccentrically mounted cam, a handle for turning the same, a cam roller adapted to be engaged by said cam, and a shaft mounting said cam roller and being fixed to said slide, said shaft operating in a vertical slot provided in the frame.

8. A lathe cutting-off attachment as set forth in claim 5, wherein the manual means for actuating the slide in downward direction includes an eccentrically mounted cam, a handle for turning the same, a cam roller adapted to be engaged by said cam, and a shaft mounting said cam roller and being fixed to said slide, said shaft operating in a vertical slot provided in the frame, and wherein the spring means for effecting return travel of the slide comprises a compression spring operative in said slot and which is adapted to be compressed by said shaft as the latter moves downwardly in said slot.

9. A lathe cutting-off attachment as set forth in claim 5, wherein said clamping plates secure the flat side faces of the blade against the front face of the slide, and said front face and at least the inner face of one clamping plate are vertically grooved to provide relief for the cutting edge of the blade.

JASPER MAZAR.

References Cited in the file of this patent

UNITED STATES PATENTS

| Number | Name | Date |
|---|---|---|
| 8,044 | Dennison | Apr. 15, 1851 |
| 129,273 | Feeman | July 16, 1872 |
| 151,111 | Fawcett | May 19, 1874 |
| 429,571 | Johnson | June 3, 1890 |
| 1,084,533 | Calaway | Jan. 13, 1914 |
| 1,210,457 | Geer | Jan. 2, 1917 |
| 1,405,784 | Hufstedler | Feb. 7, 1922 |
| 1,447,247 | Hillsdorf | Mar. 6, 1923 |
| 1,468,935 | Vosper | Sept. 25, 1923 |
| 1,925,498 | Plante | Sept. 5, 1933 |
| 2,137,716 | Faas | Nov. 22, 1938 |
| 2,255,170 | Kelley | Sept. 9, 1941 |
| 2,323,663 | Kelley | July 6, 1943 |
| 2,395,365 | Wilson et al. | Feb. 19, 1946 |

FOREIGN PATENTS

| Number | Country | Date |
|---|---|---|
| 166,621 | Germany | Dec. 28, 1905 |
| 18,356 | Great Britain | Sept. 12, 1905 |
| 107,671 | Great Britain | July 12, 1917 |